United States Patent
Wang et al.

(10) Patent No.: US 10,500,679 B2
(45) Date of Patent: Dec. 10, 2019

(54) RESISTANCE WELDING ELECTRODE AND METHOD OF RESISTANCE WELDING

(71) Applicant: GM GLOBAL TECHNOLOGY OPERATIONS LLC, Detroit, MI (US)

(72) Inventors: Hui-Ping Wang, Troy, MI (US); David R. Sigler, Shelby Township, MI (US); Blair E. Carlson, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 388 days.

(21) Appl. No.: 15/470,062

(22) Filed: Mar. 27, 2017

(65) Prior Publication Data

US 2017/0282303 A1 Oct. 5, 2017

Related U.S. Application Data

(60) Provisional application No. 62/315,055, filed on Mar. 30, 2016.

(51) Int. Cl.
*B23K 35/02* (2006.01)
*B23K 11/11* (2006.01)
(Continued)

(52) U.S. Cl.
CPC ...... *B23K 35/0255* (2013.01); *B23K 11/0026* (2013.01); *B23K 11/115* (2013.01);
(Continued)

(58) Field of Classification Search
CPC ... B23K 11/3009; B23K 11/115; B23K 11/20; B23K 11/30; B23K 35/0255;
(Continued)

(56) References Cited

U.S. PATENT DOCUMENTS

| 5,783,794 A | 7/1998 | Oikawa et al. |
| 6,037,559 A | 3/2000 | Okabe et al. |

(Continued)

FOREIGN PATENT DOCUMENTS

JP 11342477 12/1999

OTHER PUBLICATIONS

Sigler et al., U.S. Appl. No. 14/883,249 entitled "Multi-State Resistance Spot Welding Method for Workpiece Stack-Up Having Adjacent Steel and Aluminum Workpieces," filed Oct. 14, 2015.

(Continued)

*Primary Examiner* — Geoffrey S Evans
(74) *Attorney, Agent, or Firm* — Reising Ethington P.C.

(57) ABSTRACT

A radially slotted welding electrode is disclosed that may be used in conjunction with a companion second welding electrode to conduct resistance spot welding on a workpiece stack-up assembly that includes a steel workpiece and an overlapping adjacent aluminum workpiece, especially when an intermediate organic material layer is disposed between the workpiece faying surfaces of the steel and aluminum workpieces. The radially slotted welding electrode includes a weld face that has a central upstanding plateau and a convex dome portion that surrounds the central upstanding plateau and which includes a plurality of circumferentially spaced trapezoidal weld face sections that include transverse upstanding arcuate ridges. Together, the central upstanding plateau and the trapezoidal weld face sections of the convex dome portion define an annular channel that surrounds the central plateau and a plurality of radial slots that communicate with and extend outwards from the central channel.

10 Claims, 3 Drawing Sheets

(51) Int. Cl.
  *B23K 11/20*   (2006.01)
  *B23K 11/18*   (2006.01)
  *B23K 11/30*   (2006.01)
  *B23K 11/00*   (2006.01)
  *B23K 101/00*  (2006.01)
  *B23K 103/20*  (2006.01)

(52) U.S. Cl.
  CPC ............ *B23K 11/185* (2013.01); *B23K 11/20* (2013.01); *B23K 11/30* (2013.01); *B23K 11/3009* (2013.01); *B23K 11/3018* (2013.01); *B23K 35/02* (2013.01); *B23K 2101/006* (2018.08); *B23K 2103/20* (2018.08)

(58) Field of Classification Search
  CPC ............ B23K 11/3018; B23K 2103/20; B23K 11/0026; B23K 11/185
  USPC ................................................. 219/119, 120
  See application file for complete search history.

(56) References Cited

U.S. PATENT DOCUMENTS

| | | |
|---|---|---|
| 7,850,059 B2 | 12/2010 | Kobayashi et al. |
| 7,935,908 B2 | 5/2011 | Nakagawa et al. |
| 7,951,465 B2 | 5/2011 | Urushihara et al. |
| 7,984,840 B2 | 7/2011 | Kobayashi et al. |
| 8,020,749 B2 | 9/2011 | Kobayashi et al. |
| 8,058,584 B2 | 11/2011 | Miyamoto et al. |
| 8,487,206 B2 | 7/2013 | Urushihara et al. |
| 2005/0247679 A1 | 11/2005 | Wang |
| 2009/0255908 A1 | 10/2009 | Sigler et al. |
| 2013/0189023 A1 | 7/2013 | Spinella |
| 2013/0263638 A1 | 10/2013 | Gugel et al. |
| 2014/0360986 A1 | 12/2014 | Sigler et al. |
| 2015/0053654 A1 | 2/2015 | Sigler et al. |
| 2015/0053655 A1 | 2/2015 | Sigler et al. |
| 2015/0083693 A1 | 3/2015 | Schroth et al. |
| 2015/0096961 A1 | 4/2015 | Carlson et al. |
| 2015/0096962 A1 | 4/2015 | Sigler et al. |
| 2015/0231729 A1 | 8/2015 | Yang et al. |
| 2015/0231730 A1 | 8/2015 | Yang et al. |
| 2015/0352658 A1 | 12/2015 | Yang et al. |
| 2015/0352659 A1 | 12/2015 | Sigler et al. |
| 2016/0016252 A1 | 1/2016 | Edwards, II |
| 2016/0039039 A1* | 2/2016 | Edwards, II ....... B23K 11/3009 219/86.1 |
| 2016/0158874 A1 | 6/2016 | Wang et al. |
| 2016/0271721 A1* | 9/2016 | Watanabe ............ B23K 11/115 |
| 2016/0288242 A1 | 10/2016 | Sigler et al. |
| 2016/0346865 A1 | 12/2016 | Sigler et al. |
| 2017/0008118 A1 | 1/2017 | Yang et al. |

OTHER PUBLICATIONS

Yang et al., U.S. Appl. No. 14/962,866 entitled "Welding Electrode for Use in Resistance Spot Welding Workpiece Stack-Ups that Include an Aluminum Workpiece and a Steel Workpiece," filed Dec. 8, 2015.

Sigler et al., U.S. Appl. No. 15/097,821 entitled "Resistance Spot Welding Steel and Aluminum Workpieces with Electrode Having Insert," filed Apr. 13, 2016.

Sigler et al., U.S. Appl. No. 15/137,778 entitled "External Heat Assisted Welding of Dissimilar Metal Workpieces," filed Apr. 25, 2016.

Sigler et al., U.S. Appl. No. 15/418,768 entitled "Welding Electrode Cutting Tool and Method of Using the Same," filed Jan. 29, 2017.

Sigler et al., U.S. Appl. No. 15/418,771 entitled "Welding Electrode Cutting Tool and Method of Using the Same," filed Jan. 29, 2017.

Wang et al., U.S. Appl. No. 15/442,155 entitled "Mating Electrodes for Resistance Spot Welding of Aluminum Workpieces to Steel Workpieces," filed Feb. 24, 2017.

Wang et al., "Interface microstructure and weld strength of steel/aluminum alloy joints by resistance spot welding," Applied Mechanics and Materials, vols. 117-119 (2012) pp. 1895-1899.

Zhang et al., "Effects of resistance spot welding parameters on microstructures and mechanical properties of dissimilar material joints of galvanised high strength steel and aluminum alloy," Science and Technology of Welding Journal, vol. 16 (2011) No. 2 pp. 153-161.

Weihua et al., "Microstructure and mechanical property of resistance spot welded joint of aluminum alloy to high strength steel with especial electrodes," China Welding, vol. 20 (Jun. 2011) No. 2 pp. 1-6.

Weihua et al., "Interfacial characterization of resistance spot welded joint of steel and aluminum alloy," China Welding, vol. 19 (Dec. 2010) No. 4 pp. 6-10.

Zhang et al., "Characterization of Intermetallic Compounds in Dissimilar Material Resistance Spot Welded Joint of High Strength Steel and Aluminum Alloy," ISIJ International, vol. 51 (2011) No. 11 pp. 1870-1877.

Choi et al., "A Hybrid Joining Technology for Aluminum/Zinc Coated Steels in Vehicles," J. Mater. Sci. Technol., 2010, 26(9), pp. 858-864.

Hwang et al., "Dissimilar Metal Welding of Steel to Al—Mg Alloy by Spot Resistance Welding," Advanced Materials Research, vols. 15-17 (2007) pp. 381-386.

Imaizumi et al., "Joining Aluminum Automotive Body Alloys to Mild Steel by Resistance Spot Welding," Journal of the Japan Light Metal Welding and Construction Association, vol. 17 (Feb. 1979) No. 1 pp. 10-17.

Miyamoto et al., "Dissimilar Joining of Aluminum Alloy and Steel by Resistance Spot Welding," SAE Int. J. Mater. Manuf., vol. 2 (2009) Issue 1 pp. 58-67.

Mortazavi et al., "Investigation on Joint Strength of Dissimilar Resistance Spot welds of Aluminum Alloy and Low Carbon Steel," Advanced Materials Research, vols. 264-265 (2011) pp. 384-389.

Qiu et al., "Resistance Spot Welding between Aluminum Alloy and Low-Carbon Steel," Advanced Materials Research, vol.s 189-193 (2011) pp. 3534-3540.

Qui et al., "Interfacial microstructure and strength of steel/aluminum alloy joints welded by resistance spot welding with cover plate," Journal of Materials Processing Technology, 209 (2009) pp. 4186-4193.

Ueda et al., "Effects of Zn-Based Alloys Coating on Mechanical Properties and Interfacial Microstructures of Steel/Aluminum Alloy Dissimilar Metals Joints Using Resistance Spot Welding," Materials Transactions, vol. 52 (Apr. 2011) No. 5 pp. 967-973.

* cited by examiner

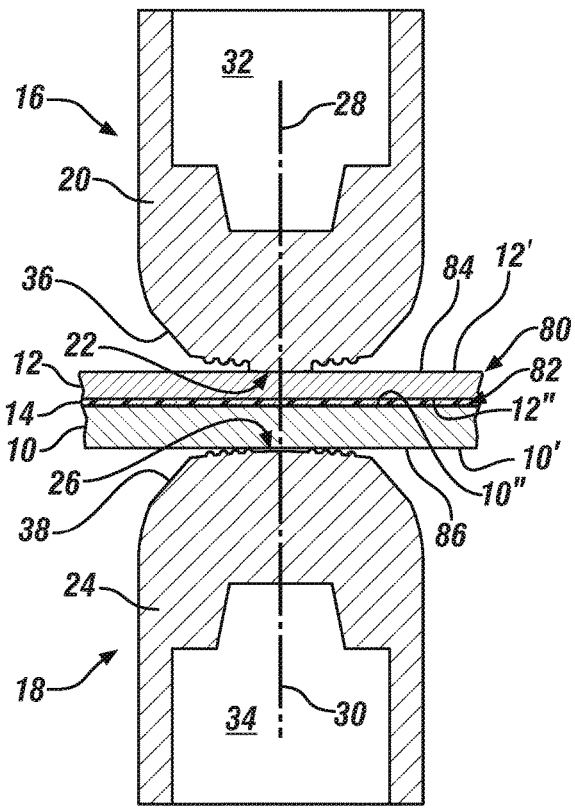
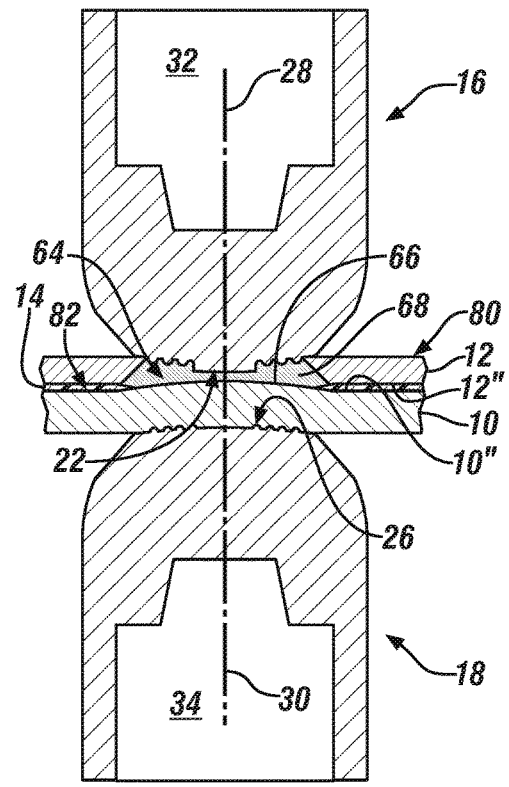
FIG. 1   FIG. 8
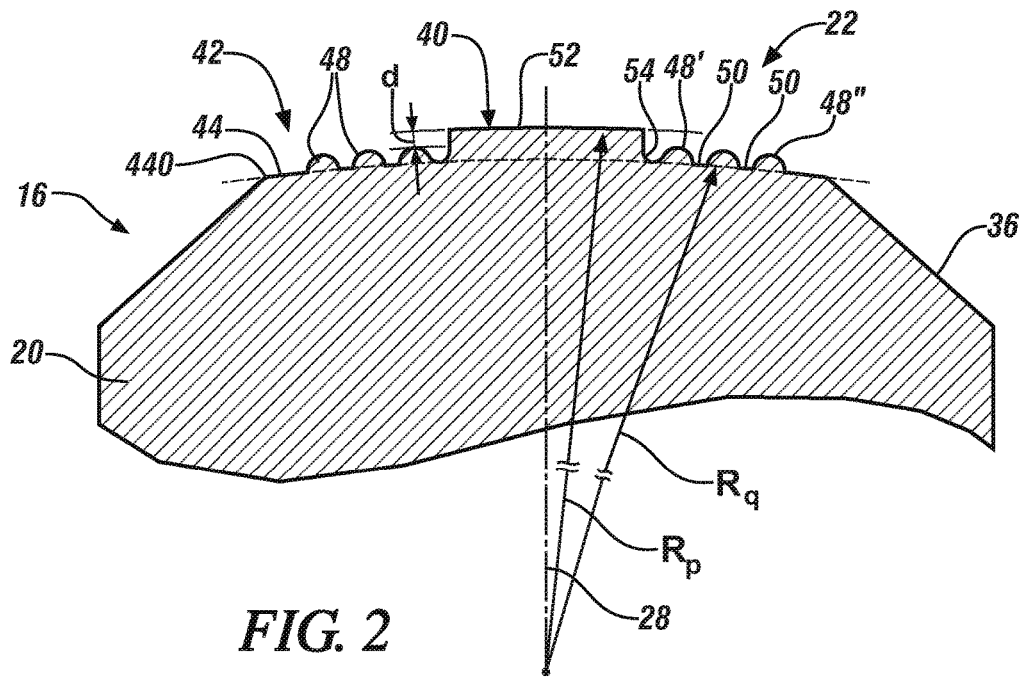
FIG. 2

RESISTANCE WELDING ELECTRODE AND METHOD OF RESISTANCE WELDING

CROSS-REFERENCE TO RELATED APPLICATION(S)

This application claims the benefit of U.S. Provisional Application No. 62/315,055 filed on Mar. 30, 2016. The entire contents of the aforementioned provisional application are incorporated herein by reference in their entirety.

TECHNICAL FIELD

This disclosure pertains generally to the use of a radially slotted welding electrode and the use of such an electrode in combination with an opposing welding electrode to conduct resistance spot welding on a workpiece stack-up assembly that includes a steel workpiece and an overlapping and adjacent aluminum workpiece. The radially slotted welding electrode is particularly useful when an intermediate organic material layer is present between the aluminum and steel workpieces of the workpiece stack-up assembly.

INTRODUCTION

The joining of a steel workpiece to a lighter-weight aluminum workpiece (unalloyed aluminum or an aluminum alloy having 85% by weight or more aluminum) provides a weight reduction, while retaining suitable strength, in many articles of manufacture. The practice offers many weight-saving opportunities such as, for example, in the manufacture of structural frame members (e.g., body sides and cross members) and vehicle closure members (e.g. vehicle doors, hoods, trunk lid, and lift-gates), among others. Many such automotive component members have inner and outer panels that are complementarily shaped to provide a stronger more rigid structure as well as to enclose windows, closure members, insulation, electrical wiring, and the like. The steel and aluminum workpieces are usually shaped with like-shaped peripheral edges or flanges that enable them to be joined with a series of suitably spaced resistance spot welds that are strategically located along their peripheries. An intermediate organic material may also be applied between the facing surfaces to be joined in the closing of the panel structure to provide further bonding strength, sound dampening qualities, and/or some other attribute.

In the formation of a resistance spot weld, the steel and aluminum workpieces are stacked and fixtured together in face-to-face contact with engaged faying surfaces at each location where a spot weld is to be formed. Two welding electrodes that are arranged in co-linear facial opposition against their respective outer surfaces of the workpiece stack-up assembly then deliver an electrical current through overlapping and adjacent steel and aluminum workpieces. The passing electrical current momentarily forms a molten weld pool within the aluminum workpiece that, in turn, wets the adjacent faying surface of the steel workpiece. The steel workpiece does not melt and contribute to the molten weld pool. After a short period of electrical current flow, typically no longer than a second or two, the electrical welding current is terminated with the opposing electrodes still pressed against their respective workpiece stack-up outer surfaces. The steel and aluminum workpieces cool in the ambient environment—although differences in the thermal conductivities of the two materials causes heat to disseminate differently through the workpieces from the weld location—and the molten weld pool solidifies in the aluminum workpiece to form a weld joint bonded to the steel workpiece. The weld joint includes a weld nugget and, typically, a brittle intermetallic layer between the weld nugget and the steel workpiece. The intermetallic layer may include various Fe—Al intermetallic compounds.

In practice, however, spot welding a steel workpiece to an aluminum workpiece is challenging since a number of characteristics of those two metals can adversely affect the strength—most notably the peel strength and the cross-tension strength—of the weld joint. Regarding the properties of the dissimilar metals, aluminum has a relatively low melting point (~600° C.) and relatively low electrical and thermal resistivities, while steel has a relatively high melting point (~1500° C.) and relatively high electrical and thermal resistivities. As a result of these physical differences, most of the heat is generated within the steel workpiece during current flow such that a heat imbalance exists between the steel workpiece and the aluminum workpiece. The combination of the heat imbalance created during current flow and the high thermal conductivity of the aluminum workpiece means that, immediately after the electrical current ceases, a situation occurs where heat is not disseminated symmetrically from the weld site. Instead, heat is conducted from the hotter steel workpiece through the aluminum workpiece towards the spot welding electrode on the other side of the aluminum workpiece, which creates a steep thermal gradient in that direction.

The development of a steep thermal gradient between the steel workpiece and the spot welding electrode on the other side of the aluminum workpiece is believed to weaken the resultant weld joint in several ways. First, because the steel workpiece retains heat longer than the aluminum workpiece after the flow of electrical current has ceased, the molten aluminum weld pool created during current flow solidifies directionally, starting from the region nearest the colder spot welding electrode (often water cooled) proximate the aluminum workpiece and propagating towards the faying interface. A solidification front of this kind tends to sweep or drive defects—such as gas porosity, shrinkage voids, and micro-cracking—towards and along the faying interface within the weld joint where the residual oxide film and/or the composite residue film are already present. Second, the sustained elevated temperature in the steel workpiece promotes the growth of a hard and brittle Fe—Al intermetallic layer at and along the faying interface. Having a dispersion of weld defects together with excessive growth of the Fe—Al intermetallic layer along the faying interface tends to reduce the peel and cross-tension strength of the weld joint.

The challenges that tend to complicate the resistance spot welding of steel and aluminum workpieces extends beyond their materially divergent properties. Each of the steel and aluminum workpieces may, in some instances, include applied or natural surface coatings that differ in composition from their underlying base substrates. The aluminum workpiece, for example, may contain a refractory surface oxide layer. This oxide layer is typically composed of aluminum oxide compounds, although other oxide compounds may also be present such as, for example, magnesium oxide compounds when the aluminum workpiece contains a magnesium-containing aluminum alloy. The oxide layer present on the aluminum workpiece is electrically insulating and mechanically tough. As a result, a residual oxide film that includes remants of the surface oxide layer tends to remain intact at and alongside the faying surface of the steel workpiece where it can hinder the ability of the molten aluminum weld pool to wet the steel workpiece.

The complications attributed to the refractory surface oxide layer of the aluminum workpiece can be magnified when an intermediate organic material layer, such as a layer of uncured, heat-curable adhesive, is present between the faying surfaces of the aluminum and steel workpieces at the weld site. An uncured yet heat-curable adhesive layer may be disposed between the faying surfaces of the stacked workpieces to provide further bonding between the workpieces. In clamping the workpieces together by the forceful pressure applied by the welding electrodes, and prior to exchanging current, some of the adhesive is squeezed laterally out of the weld zone. The remaining adhesive is then decomposed at the location of the weld joint during current flow. Upon completion of the spot welding operation(s), the adhesive-containing regions of the welded workpieces are heated, for example, in an ELPO-bake oven (ELPO refers to an electrophoretic priming operation). The applied heating cures the adhesive layer to attain strong supporting adhesion between the confronting faying surfaces of the metal workpieces around the site(s) where spot welding has been practiced.

The intermediate organic material layer has a tendency to interact with the refractory surface oxide layer to form a more tenacious material at spot welding temperatures. To be sure, the thermal residues obtained from decomposition of the intermediate organic material layer—such as carbon ash, filler particles (e.g., silica, rubber, etc.), and other derivative materials—are believed to combine with the residual oxide film to form a composite residue film that is more resistant to mechanical break down and dispersion during current flow compared to the residual oxide film alone. The formation of a tougher composite residue film results in fragments of that film remaining grouped and compiled at and along the faying surface of the steel workpiece in a much more disruptive manner as compared to instances in which an organic material layer is not present between the steel and aluminum workpieces. Specifically, it is believed that the composite residue film blocks the diffusion of iron into the molten aluminum weld pool, which can result in excessive thickening of the hard and brittle Fe—Al intermetallic layer and, thus, weaken the weld joint. Additionally, any gases produced during decomposition of the organic material may become trapped in the molten metal pool and may eventually lead to voids or porosity within the solidified weld joint. Still further, the composite residue film may provide a ready crack path along the bonding interface of the weld joint and the steel workpiece which, again, can weaken the weld joint.

In light of the aforementioned challenges, previous efforts to spot weld a steel workpiece and an aluminum workpiece have employed a weld schedule that specifies higher currents, longer weld times, or both (as compared to spot welding steel-to-steel), in order to try and obtain a reasonable weld bond area. Such efforts have been largely unsuccessful in a manufacturing setting and have a tendency to damage the welding electrodes. Given that previous spot welding efforts have not been particularly successful, mechanical fasteners including self-piercing rivets and flow-drill screws have predominantly been used instead. Mechanical fasteners, however, take longer to put in place and have high consumable costs compared to spot welding. They also add weight to the vehicle—weight that is avoided when joining is accomplished by way of spot welding—that offsets some of the weight savings attained through the use of an aluminum workpiece in the first place. Advancements in spot welding that would make it easier to join steel and aluminum workpieces despite the many challenges involved would thus be a welcome addition to the art.

SUMMARY

One embodiment of a method of resistance spot welding a workpiece stack-up assembly that includes an aluminum workpiece and an overlapping adjacent steel workpiece may include several steps. To begin, a workpiece stack-up assembly is provided that has a first side and an opposed second side. The workpiece stack-up assembly includes an aluminum workpiece and an adjacent steel workpiece that overlaps the aluminum workpiece, and further includes an intermediate organic material layer disposed between confronting faying surfaces of the overlapping aluminum and steel workpieces. Additionally, within the stack-up assembly, the aluminum workpiece is proximate the first side of the stack-up assembly and the steel workpiece is proximate the second side of the stack-up assembly.

Next, after the workpiece stack-up assembly is provided, a weld face of a radially slotted welding electrode is pressed against the first side of the workpiece stack-up assembly and a weld face of a second welding electrode is pressed against the second side of the workpiece stack-up assembly. The weld face of the radially slotted welding electrode includes a central upstanding plateau and a convex dome portion that surrounds the central upstanding plateau and which includes a plurality of trapezoidal weld face sections that are circumferentially spaced on the base surface around the central upstanding plateau. Each of the trapezoidal weld face sections includes a plurality of transverse upstanding arcuate ridges that are radially spaced apart along the base surface of the convex dome portion. Moroever, an annular channel surrounds the central upstanding plateau and a plurality of radial slots communicate with the annular channel and extend outwardly towards an outer circumference of the base surface between the trapezoidal weld face sections. The weld face of the second welding electrode is facially aligned with the weld face of the radially slotted welding electrode when the weld faces are pressed against their respective first and second sides of the workpiece stack-up assembly.

Once the welding electrodes are in place, an electrical current is passed between the weld face of the radially slotted welding electrode and the weld face of the second welding electrode to create a molten weld pool contained within the aluminum workpiece that wets the faying surface of the steel workpiece. Eventually, the passage of the electrical current between the weld face of the radially slotted welding electrode and the weld face of the second welding electrode is terminated to allow the molten weld pool to solidify into a weld joint that bonds the aluminum and steel workpieces together.

The aforementioned method of resistance spot welding the workpiece stack-up assembly may be further defined. For example, the first side of the workpiece stack-up assembly may an outer surface of the aluminum workpiece and the second side of the workpiece stack-up assembly may an outer surface of the steel workpiece. In another example, the workpiece stack-up assembly may include an additional aluminum workpiece and/or an additional steel workpiece in addition to the aluminum and steel workpieces that overlap and are adjacent to one another.

Still further, during pressing of the the weld face of the radially slotted welding electrode against the first side of the workpiece stack-up assembly, a plateau surface of the central upstanding plateau may contact the first side of the stack-up assembly before any of the transverse upstanding arcuate ridges included the plurality of trapezoidal weld face sections contacts the first side such that a clamping load applied by the weld faces of the radially slotted and second welding electrodes is initially transferred through the central upstanding plateau. In another implementation of the aforementioned method, only the plateau surface of the central upstanding plateau contacts the first side of the workpiece stack-up assembly prior to the passage of electrical current. Then, during passage of the electrical current, the trapezoidal weld face sections of the convex dome portion that surrounds the central upstanding plateau progressively come into contact with the first side of the workpiece stack-up assembly starting with innermost upstanding arcuate ridges of the trapezoidal weld face sections and continuing radially outwards towards outermost upstanding arcuate ridges of the trapezoidal weld face sections.

The weld face of the second welding electrode that is pressed against the second side of the workpiece stack-up assembly may assume a variety of constructions. For instance, the weld face of the second welding electrode may include a convex base weld face surface and a plurality of upstanding circular ridges that project outwardly from the convex base weld face surface such that the upstanding circular ridges are separated by intervening circular portions of the convex base weld face surface. And, in one particular implementation, the diameter of the innermost upstanding circular ridge of the weld face of the second welding electrode may be smaller than the diameter of the plateau surface of the central upstanding plateau of the weld face of the radially slotted welding electrode.

A radially slotted welding electrode according to one embodiment of the present disclosure may include a body and a weld face carried by one end of the body. The weld face may comprise a central upstanding plateau, having a plateau surface, and a convex dome portion surrounding the central upstanding plateau. The convex dome portion may further comprise a base surface and a plurality of trapezoidal weld face sections that are circumferentially spaced on the base surface around the central upstanding plateau. Each of the trapezoidal weld face sections may include a plurality of transverse upstanding arcuate ridges that are radially spaced apart along the base surface of the convex dome portion. What is more, a plurality of radial slots may communicate with an annular channel that surrounds the central upstanding plateau and may extend outwardly towards an outer circumference of the base surface of the convex dome portion. In that regard, each of the plurality of radial slots extends between two adjacent trapezoidal weld face sections.

The radially slotted welding electrode according to the aforementioned embodiment may have certain structural design features. As one example, each of the trapezoidal weld face sections may include two to ten transverse upstanding arcuate ridges in which each of the transverse upstanding arcuate ridges in each of the trapezoidal weld face sections has a ridge height that ranges from 20 μm to 400 μm and is separated from each of its adjacent ridges by a radial spacing of 50 μm to 1800 μm. Additionally, as another example, the plateau surface of the central upstanding plateau may be positively displaced above the surrounding base weld face surface of the convex dome portion such that the plateau surface is raised above an innermost transverse upstanding arcuate ridge of each of the plurality of trapezoidal weld face sections. Other structural design features may of course be implemented.

BRIEF DESCRIPTION OF THE DRAWINGS

FIG. 1 is an enlarged schematic side view, in cross-section, of a workpiece stack-up assembly that includes an aluminum workpiece on top of a steel workpiece with an intermediate organic material layer, wherein a radially slotted welding electrode welding according to one embodiment of the disclosure is shown engaged to the aluminum workpiece and another welding electrode is shown engaged to the steel workpieces just prior to the commencement of an electrical current between the opposed welding electrodes;

FIG. 2 is a fragmentary cross-sectional view of the weld face of the radially slotted welding electrode shown in FIG. 1 that is making contact with the aluminum workpiece;

FIG. 8 is an enlarged schematic side view, in cross-section, of the workpiece stack-up assembly and opposed welding electrodes shown in FIG. 1 in which the welding electrodes are in full engagement with their respective workpieces after termination of the passing electrical current.

DETAILED DESCRIPTION

Figure 3:
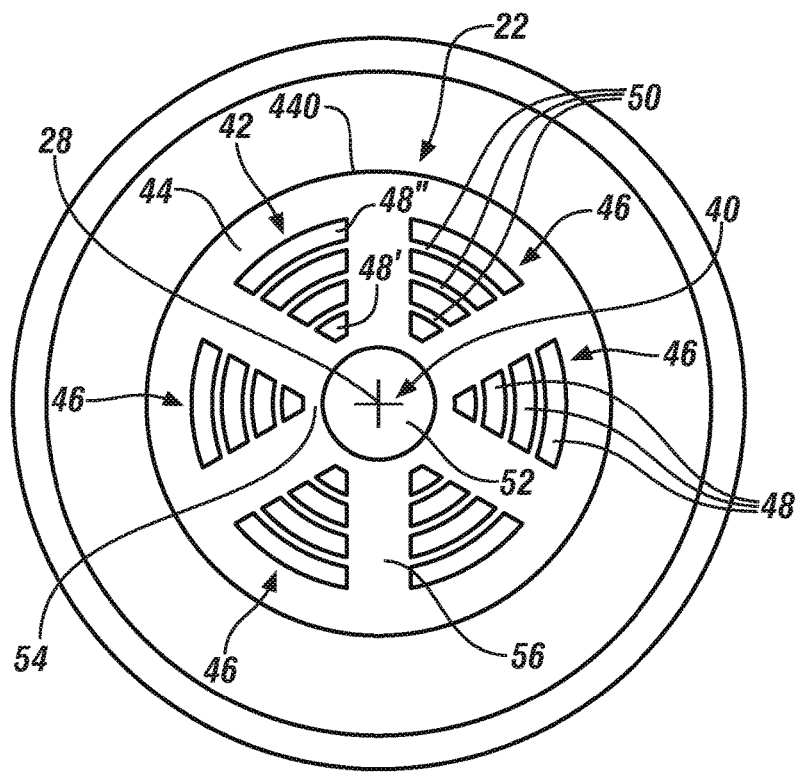
FIG. 3 is a plan view of weld face of the radially slotted welding electrode shown in FIGS. 1-2.

The present disclosure pertains to the design of a welding electrode that may be used in conjunction with another, opposed welding electrode to conduct resistance spot welding between a steel workpiece and an aluminum workpiece that are located adjacent to one another in a workpiece stack-up assembly, particularly when an intermediate organic material is disposed between the steel and aluminum workpieces. The disclosed welding electrode is radially slotted and is intended to engage and be pressed against the workpiece stack-up assembly proximate the aluminum workpiece in opposition and facial alignment with another welding electrode that engages and is pressed against the stack-up assembly proximate the steel workpiece. The radially slotted welding electrode comprises a central plateau surrounded by a portion of a convex dome that includes a plurality of circumferentially spaced trapezoidal weld face sections that include transverse upstanding arcuate ridges that are radially spaced from each other. The central plateau and the trapezoidal weld face sections define an annular channel surrounding the central plateau and a plurality of radial slots that extend from the annular channel out towards a circumference of the weld face. The design of the radially slotted welding electrode is effective to expel organic material laterally away from the weld zone between the steel and aluminum workpiece before the weld joint is formed.

Referring now to FIGS. 1-8, a radially slotted welding electrode 16 along with an opposed companion welding electrode 18 are described along with a method of using those spot welding electrodes 16, 18. In the enlarged schematic view of FIG. 1, a workpiece stack-up assembly 80 is illustrated that includes a portion of a steel workpiece sheet 10 and an adjacent overlapping portion of an aluminum workpiece 12. The assembled steel and aluminum workpieces 10, 12 may, for example, be portions, respectively, of an aluminum outer body side panel and a steel inner body side panel for an automotive vehicle. Each panel may have been previously shaped. The steel and aluminum workpieces 10, 12 make indirect interfacial contact at a faying interface 82 that extends through a spot weld location where joining is desired. The indirect contact experienced between the workpieces 10, 12 is a result of an intermediate organic material layer 14 that has been broadly applied between the workpieces 10, 12 through the weld zone prior to spot welding. The illustrated portions of the workpieces may, for example, be at the periphery of the stack-up assembly 80 where a series of resistance spot welds are to be formed in spaced-apart alignment along the peripheral edges.

The steel workpiece 10 includes a steel substrate from any of a wide variety of strengths and grades that is either coated or uncoated. The steel substrate may be hot-rolled or cold-rolled and may be composed of steel such as mild steel, interstitial-free steel, bake-hardenable steel, high-strength low-alloy (HSLA) steel, dual-phase (DP) steel, complex-phase (CP) steel, martensitic (MART) steel, transformation induced plasticity (TRIP) steel, twining induced plasticity (TWIP) steel, and boron steel such as when the steel workpiece 10 includes press-hardened steel (PHS). If coated, the steel substrate preferably includes a surface layer of zinc (galvanized), a zinc-iron alloy (galvanneal), a zinc-nickel alloy, nickel, aluminum, an aluminum-magnesium alloy, an aluminum-zinc alloy, or an aluminum-silicon alloy, any of which may have a thickness of up to 50 μm and may be present on each side of the steel substrate. Taking into account the thickness of the steel substrate and any optional surface layer that may be present, the steel workpiece 10 may have a thickness that ranges from 0.3 mm and 6.0 mm, or more narrowly from 0.6 mm to 2.5 mm, at least at the spot weld location.

The aluminum workpiece 12 includes an aluminum substrate that is either coated or uncoated. The aluminum substrate may be composed of unalloyed aluminum or an aluminum alloy that includes at least 85 wt % aluminum. Some notable aluminum alloys that may constitute the coated or uncoated aluminum substrate are an aluminum-magnesium alloy, an aluminum-silicon alloy, an aluminum-magnesium-silicon alloy, and an aluminum-zinc alloy. If coated, the aluminum substrate may include a surface layer of a refractory oxide material comprised of aluminum oxide compounds and possibly other oxide compounds as well, such as magnesium oxide compounds if the aluminum substrate is an aluminum-magnesium alloy. The aluminum substrate may also be coated with a layer of zinc, tin, or a metal oxide conversion coating comprised of oxides of titanium, zirconium, chromium, or silicon, as described in US Pat. Pub. No. 2014/0360986. The surface layer may have a thickness ranging from 1 nm to 10 μm and may be present on each side of the aluminum substrate. Taking into account the thickness of the aluminum substrate and any optional surface layer that may be present, the aluminum workpiece 12 may have a thickness that ranges from 0.3 mm to about 6.0 mm, or more narrowly from 0.5 mm to 3.0 mm, at least at the spot weld location.

The aluminum substrate of the aluminum workpiece 12 may be provided in wrought or cast form. For example, the aluminum substrate may be composed of a 4xxx, 5xxx, 6xxx, or 7xxx series wrought aluminum alloy sheet layer, extrusion, forging, or other worked article. Alternatively, the aluminum substrate may be composed of a 4xx.x, 5xx.x, 6xx.x, or 7xx.x series aluminum alloy casting. Some more specific kinds of aluminum alloys that may constitute the aluminum substrate include, but are not limited to, AA5754 and AA5182 aluminum-magnesium alloy, AA6111 and AA6022 aluminum-magnesium-silicon alloy, AA7003 and AA7055 aluminum-zinc alloy, and Al-10Si-Mg aluminum die casting alloy. The aluminum substrate may further be employed in a variety of tempers including annealed (O), strain hardened (H), and solution heat treated (T), if desired.

The workpiece stack-up assembly 80 includes a first outer surface 84 proximate the aluminum workpiece 12 and a second outer surface 86 proximate the steel workpiece 10. The term "proximate" as used in this context means a surface of the actual aluminum or steel workpiece 10, 12 or the surface of a nearby workpiece of the same side of the stack-up assembly 80 as the aluminum or steel workpiece 10, 12. For instance, when only the steel and aluminum workpieces 10, 12 are present in the stack-up assembly 80 (e.g., a "2T" stack-up), as shown here in FIG. 1, an outer workpiece surface 12' of the aluminum workpiece 12 provides the first outer surface 84 and an outer workpiece surface 10' of the steel workpiece 10 provides the second outer surface 86. In other embodiments, however, an additional workpiece may be disposed on either or both sides of the adjacent steel and aluminum workpieces 10, 12 so long as the additional workpieces is of the same base metal type as its immediate neighboring steel or aluminum workpiece 10, 12. For example, the workpiece stack-up assembly 80 may include an additional aluminum workpiece disposed adjacent to and covering the outer workpiece surface 12' of the aluminum workpiece 12 that lies adjacent to the steel workpiece 10, and/or it may include an additional steel workpiece disposed adjacent to and covering the outer workpiece surface 10' of the steel workpiece 10 that lies adjacent to the aluminum workpiece 12. When another additional workpiece is present, the first and/or second outer surface 84, 86 of the stack-up assembly 80 may be provided by an additional workpiece.

The fact that the workpiece stack-up assembly 80 may include at least one other additional workpiece besides the adjacent steel and aluminum workpieces 10, 12 which overlap to form the faying interface 82 does not change the basic function of the welding electrodes 16, 18 or their effect on a spot weld formed between the adjacent steel and aluminum workpieces 10, 12. In either instance, as will be further explained below, a spot weld that comprises a weld joint contained within the aluminum workpiece 12 is formed by an electrical current delivered between the spot welding electrodes 16, 18, and the resultant weld joint upon solidification bonds to the adjacent faying surface of the steel workpiece 10. Consequently, the generalized depictions of the workpiece stack-up assembly 80 shown in FIGS. 1-3 are illustrated only with the adjacent steel and aluminum workpieces 10, 12 for simplicity since the bonding action that occurs between those two workpieces 10, 12 is virtually the same regardless if an additional workpiece is disposed next to one or both of the workpieces 10, 12. The structure of the welding electrodes 16, 18 and their use in conjunction with the workpiece stack-up assembly 80 is, however, also fully applicable to assemblies that include just the adjacent steel and aluminum workpieces 10, 12 as well as others that include an additional workpiece or workpieces.

The intermediate organic material layer 14 that is applied between the steel and aluminum workpieces 10, 12 may be a weld-through adhesive, a sealer, a sound-damping material, or any other intervening material that can be spot welded through given the clamping force of the welding electrodes and the magnitude and duration of electrical current flow between the electrodes. For example, the intermediate organic material 14 may be an uncured yet heat-curable adhesive. Such an adhesive may be broadly disposed between a faying surface 10" of the steel workpiece 10 and a faying surface 12" of the aluminum workpiece 12 so that, after spot welding, the workpiece stack-up assembly 80 can be heated in an (ELPO) prime coat paint-bake oven, or other device, to cure the adhesive and provide additional boding between the workpieces 10, 12. Suitable adhesives, which may incorporate one or more chemical entities, can be any of a wide variety of curable polymer systems such as heat curable epoxies and polyurethanes. Indeed, a specific example of a suitable heat-curable adhesive is a heat-curable epoxy that may include filler particles, such as silica particles, to modify the viscosity profile or other properties of the adhesive for manufacturing operations. A variety of heat-curable epoxies are commercially available, including DOW Betamate 1486, Henkel Terokal 5089, and Uniseal 2343. The intermediate organic material layer 14 is typically applied to a thickness between the workpiece faying surfaces 10", 12" of 0.1 mm to 2.0 mm before the clamping force of the welding electrodes 16, 18 is applied to the workpiece stack-up 80.

Referring now specifically to FIG. 1, the radially slotted welding electrode 16 and the opposed companion second welding electrode 18 are shown engaged with the workpiece stack-up 80 in facial alignment with one another. More specifically, the radially slotted welding electrode 16 is engaged with the first outer surface 84 proximate the aluminum workpiece 12, and the opposed second welding electrode is engaged with the second outer surface 86 proximate the steel workpiece 10. The welding electrodes 14, 16 can be formed of any suitable electrically and thermally conductive material. For example, the welding electrodes 14, 16 may be constructed from a material having an electrical conductivity of at least 45% IACS and a thermal conductivity of at least 180 W/mK. Some material classes that fit this criterion include a copper alloy and a refractory-based material that includes at least 35 wt %, and preferably at least 50 wt %, of a refractory metal. Specific examples of suitable copper alloy include a C15000 copper-zirconium (CuZr) alloy, a C18200 copper-chromium (CuCr) alloy, and a C18150 copper-chromium-zirconium (CuCrZr) alloy, while the a suitable refractory-based material may include a molybdenum or tungsten particulate phase such as a tungsten-copper metal composite that contains between 50 wt % and 90 wt % of a tungsten particulate phase dispersed in copper matrix that constitutes the balance (between 50 wt % and 10 wt %) of the composite. Other materials not expressly listed here that meet the applicable electrical and thermal conductivity standards may, of course, also be used as well.

The radially slotted welding electrode 16 includes a body 20 and a first weld face 22 and, likewise, the second welding electrode 18 includes a body 24 second weld face 26. The first and second weld faces 22, 26 of the first and second welding electrodes 16, 18 have aligned central axes 28, 30 that extend though the center of the intended weld zone, but not necessarily through the centers of the bodies 20, 24 of the electrodes 14, 16 as one or both of the weld faces 22, 26 may be tilted relative to their respective bodies 20, 24 for better accessibility or the electrodes 16, 18 may have a singlebent or doublebend construction. The body 20, 24 of each welding electrode 14, 16, which may have a diameter between 12 mm and 22 mm, or more preferably between 15 mm and 20 mm, is machined or shaped to form a hollowed interior 32, 34 for attachment of the welding electrode 16, 18 to a separate, movable, opposing welding arm (not illustrated) configured to deliver a programmed electrical current between the electrodes 16, 18. A coolant may also be delivered through each welding arm to maintain the attached welding electrode 16, 18 at a suitable temperature. The respective motions of the welding arms are programmed to position the two welding electrodes 16, 18 on opposite sides of the workpiece stack-up assembly 80 such that the weld faces 22, 26 are facially aligned co-axially with respect to their axes 28, 30 for forming a resistance spot weld.

The shapes of the welding electrodes 16, 18 differ principally in the design of their weld faces 22, 26. For each of the first and second spot welding electrodes 14, 16, the end of the body 20, 24 opposite the entrance to the hollow interior 32, 34 transitions to a portion 36, 38 that is an inwardly profiled from the outer diameter of the body 20, 24. The inwardly profiled portion 36, 38 is preferably in the shape of a truncated cone, or a truncated sphere, and has an annular surface that accommodates the central weld face portion of the electrode 16, 18. As shown best in FIGS. 2-3, the radially slotted welding electrode 16 includes a central upstanding plateau 40 surrounded by a portion of a convex dome 42. The convex dome portion 42 has a base surface 44 that, in one particular embodiment, may be a portion of a sphere having a radius of curvature Rq that ranges from 15 mm to 300 mm, or more narrowly from 20 mm to 50 mm, and may further have a diameter (i.e., a planar reach) extending across an outer circumference 440 of the base surface 44 at the transition between the inwardly profiled portion 34 and the base surface 44. This diameter preferably ranges from 3 mm to 20 mm, or more narrowly from 4 mm to 12 mm.

The convex dome portion 42 includes a plurality of circumferentially spaced trapezoidal weld face sections 46 that include transverse upstanding arcuate ridges 48. The upstanding arcuate ridges 48 within each trapezoidal weld face section 46 project outwardly from the base surface 44 of the convex dome portion 42 and are radially spaced from each other—and thus separated by intervening circumferentially-extending portions 50 of the base surface 44—while having arc lengths that extend circumferentially about the central upstanding plateau 40. Indeed, the arc lengths of the arcuate ridges 48 within each trapezoidal weld face section 46 increases when moving from an innermost ridge 48' closest to the central round upstanding plateau 40 to an outermost ridge 48" farthest from the plateau 40 as shown best in FIG. 3. In one particular implementation of the radially slotted welding electrode 16, the convex dome portion 42 of the weld face 22 may include three to eight trapezoidal weld face sections 46 that preferably include two to ten upstanding arcuate ridges 48. Additionally, each of those two to ten transverse upstanding arcuate ridges 48 may have a ridge height that ranges from 20 μm to 400 μm, or more narrowly from 50 μm to 300 μm, an arc length that ranges anywhere from 1 mm to 15 mm, and a radial spacing between each of its adjacent ridges 48 ranges that from 50 μm to 1800 μm, or more narrowly from 80 μm to 1500 μm. The transverse upstanding arcuate ridges 48 of the several trapezoidal weld face sections 48 may be circumferentially aligned although such a relationship is not mandatory.

The central upstanding plateau 40 has a plateau surface 52 positioned at the center of the weld face 26 about the axis 28 of the weld face 22. The central upstanding plateau 40 is preferably cylindrical in shape and the plateau surface 52 is preferably circular in plan view, as shown in FIG. 3, and may have a diameter that ranges from 2 mm to 7 mm, or more narrowly from 3 mm to 5 mm. Additionally, as shown best in FIG. 2, the plateau surface 52 is positively displaced above the surrounding base surface 44 of the convex dome portion 42 of the weld face 22 by a distance "d" that may range from 100 μm to 500 μm, or more narrowly from 200 μm to 300 μm, and in most instances this distance "d" is greater than the ridge heights of the innermost ridges 48' such that the plateau surface 52 extends axially beyond all of the upstanding arcuate ridges 48 present on the convex dome portion 42. And, in terms of its surface contour, the plateau surface 52 may be planar or it may be slightly convex in profile. When the plateau surface 52 is convex in shape, it may be a portion of a sphere having a radius of curvature Rp that is greater than 50 mm such as, for example, from 50 mm to 400 mm. When the radius of curvature Rp is greater than 400 mm, the plateau surface 52 is considered to be planar. The plateau surface 52 of the central upstanding plateau 52, however, regardless of its profile, is preferably flatter than the base surface 44 of the convex dome portion 42.

The central upstanding plateau 40 and the trapezoidal weld face sections 46 of the surrounding convex dome portion 42 cooperate to define an annular channel 54 surrounding the central plateau 40 and a plurality of radial slots 56 that communicate with the annular channel 54 and extend outwardly from the annular channel 54 towards the outer circumference 440 of the base surface 44. More specifically, the annular channel 54 is defined by the central upstanding plateau 40 and the innermost upstanding arcuate ridges 48', and the radial slots 54 are defined by the ends of the transverse upstanding arcuate ridges 48 of adjacent trapezoidal weld face sections 46. The radial slots 56 have individual widths between adjacent trapezoidal weld face sections 46 that preferably range from 1/20 to 1/10 of the length of the outer circumference 440 of the base surface 44 which, in most spot welding practices, constitutes a minimum width of 1 mm to 4 mm. As will be further explained below, the combination of the central plateau 40, the trapezoidal weld face sections 46 with their transverse upstanding arcuate ridges 48, and the annular channel 54 that communicates with the radial slots 56 serves to apply pressure to the intermediate organic material layer 14 while, at the same time, providing low pressure radial slotted flow paths between the workpiece faying surfaces 10", 12" where organic material can be more easily expelled from the weld zone in addition to providing a release outlet for any gaseous products produced at the faying interface 84 during current flow.

Figure 4:
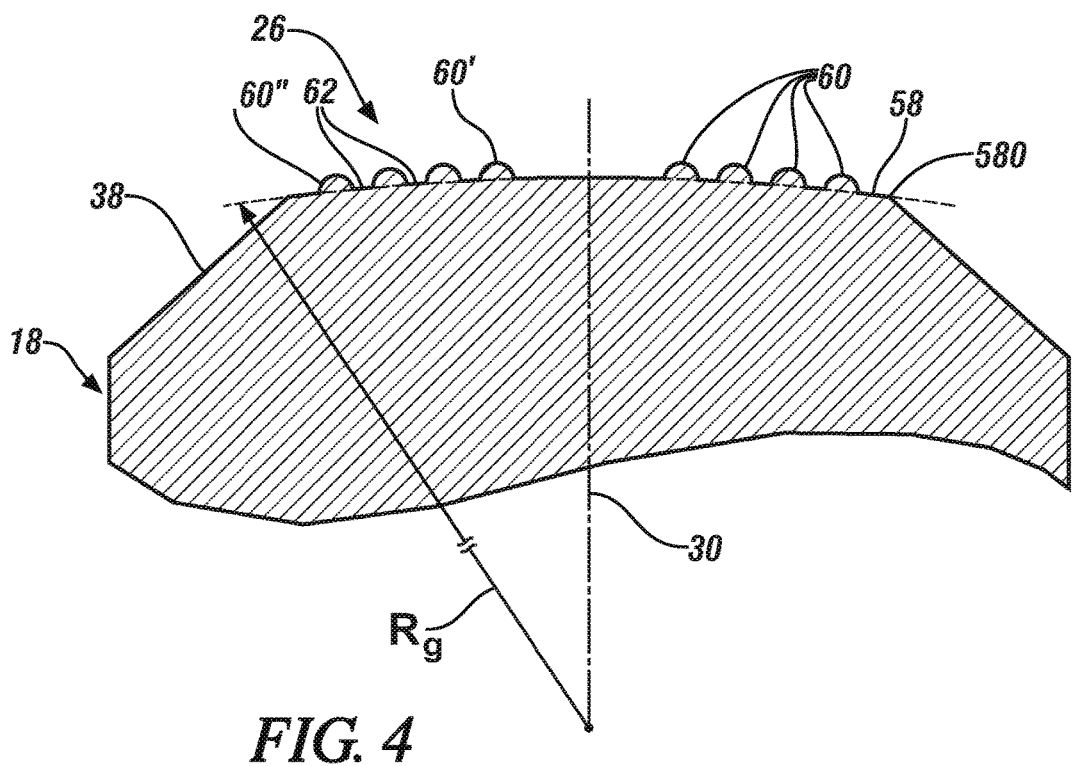
FIG. 4 is a fragmentary cross-sectional view of the weld face of the welding electrode shown in FIG. 1 that is making contact with the steel workpiece.

Referring now back to FIGS. 1 and 4, the weld face 26 of the companion second welding electrode 18 may assume any of a variety of designs that can cooperate with the weld face 22 of the radially slotted welding electrode 16 to facilitate the lateral ejection of intermediate organic material from the weld zone. In the particular embodiment shown and described here, the weld face 26 of the second welding electrode 18 includes a convex base weld face surface 58 and a plurality of upstanding circular ridges 60 (in plan view) that project outwardly from the base weld face surface 58 and, thus, are separated by intervening circular portions 62 of the base weld face surface 58. The base weld face surface 58 may, for example, be a portion of a sphere having a radius of curvature Rg that ranges from 15 mm to 300 mm, or more narrowly from 20 mm to 50 mm, and may further have a diameter (i.e., a planar reach) extending across an outer circumference 580 of the base weld face surface 58 at the transition between the inwardly profiled portion 36 and the base weld face surface 58. This diameter preferably ranges from 3 mm to 20 mm, or more narrowly from 4 mm to 12 mm.

The upstanding circular ridges 60 are concentrically centered about the axis 30 of the weld face 26 and are radially spaced from one another such that the planar diameters of the ridges increase from an innermost ridge 60' that immediately surrounds the weld face axis 30 to an outermost ridge 60" farthest from the weld face axis 30. Accordingly, in this particular embodiment, and as a distinction from the weld face 22 of the radially slotted welding electrode 16, the upstanding circular ridges 60 on the weld face 26 of the second welding electrode 18 are circumferentially closed, meaning that each ridge 60 has a continuously curved circumference that entirely surrounds the weld face axis 60 without interruption. The weld face 26 of the second welding electrode 18 preferably includes anywhere from two to ten upstanding circular ridges 60 with three to five being most preferred. Each of these upstanding circular ridges 60 has a ridge height that may range from 20 μm to 400 μm, or more narrowly 50 μm to 300 μm, and a radial spacing between each of its radially adjacent (radially inward and radially outward) ridges 60 may range from 50 μm to 1800 μm, or more narrowly from 80 μm to 1500 μm.

Figure 5:
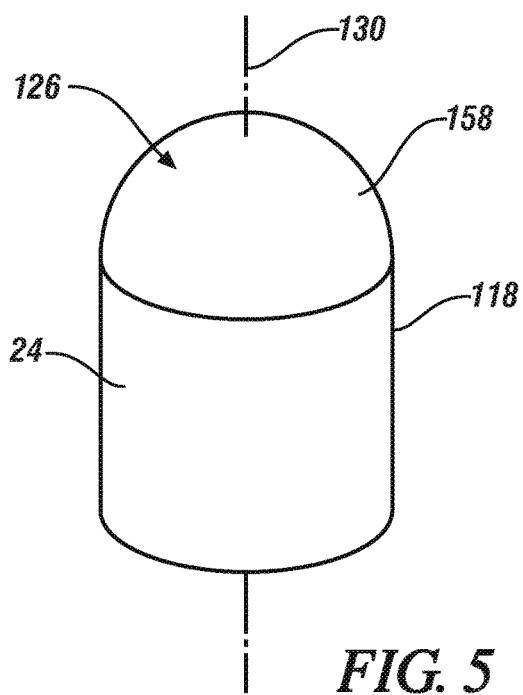
FIG. 5 is a perspective view of a ballnose welding electrode that may be used as an alternative to the welding electrode shown in FIG. 1 that is making contact with the steel workpiece.

The companion second welding electrode 18 is not necessarily limited to the construction shown in FIGS. 1 and 4 and described above. Other electrode designs may certainly be used including, for example, those illustrated in FIGS. 5-7, in which the only the primary differences from the welding electrode 18 shown in FIGS. 1 and 4 are described with the understanding that the remaining portions of the welding electrode conform to the teachings above. Referring now to FIG. 5, the second welding electrode, which is identified by reference numeral 118, may be a ballnose welding electrode of the conventional type that includes a convex weld face 126 having a base weld face surface 158 that transitions directly from the end of the body 24 opposite the entrance to the hollow interior 34 and, consequently, does not include an inwardly profiled portion between the body 24 and the weld face 126. The convex weld face 126 employed here may be a portion of a sphere or a "ball" having a diameter extending across its outer diameter that ranges from 12 mm to 22 mm and a radius of curvature that ranges from 12 mm to 400 mm.

Figure 6:
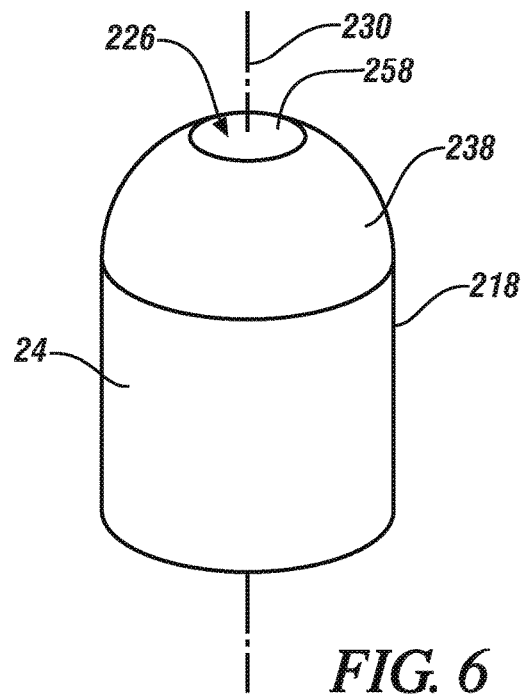
FIG. 6 is a perspective view of a ballnose welding electrode with a central flat area that may be used as an alternative to the welding electrode shown in FIG. 1 that is making contact with the steel workpiece.
Figure 7:
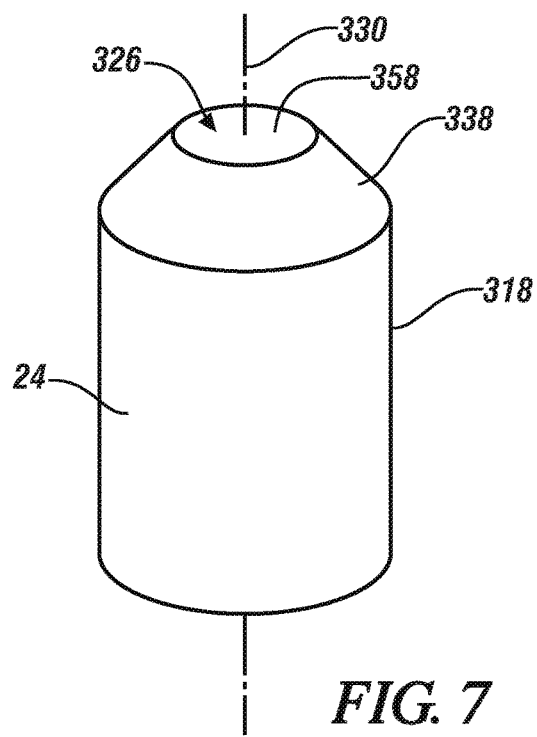
FIG. 7 is a perspective view of a truncated cone welding electrode that may be used as an alternative to the welding electrode shown in FIG. 1 that is making contact with the steel workpiece.

Alternatively, and referring now to FIG. 6, the second welding electrode, which is identified by reference numeral 218, includes a weld face 226 and an inwardly profiled portion 238 in the shape of a truncated sphere. The weld face 226 includes a base weld face surface 258 that has a diameter ranging from 3 mm to 16 mm, or more narrowly from 4 mm to 8 mm, and is either planar or convex. If the base weld face surface 258 is convex, it may be a portion of a sphere having a radius of curvature ranging from 25 mm to 400 mm. Still further, and referring now to FIG. 7, the second welding electrode, which is identified by reference numeral 318, may include a weld face 326 similar to the weld face 226 of the second welding electrode 218 shown in FIG. 6 although, here, in this embodiment, the inwardly profiled portion 338 is a truncated cone rather than a truncated sphere. The truncated cone may be inclined from 15° to 40° relative to the axis 332 of the weld face 326. Of course, the welding electrodes 118, 218, 318 shown in FIGS. 5-7 are not the only alternative electrode designs suitable for use with the radially slotted welding electrode 116; rather, other welding electrodes not explicitly shown here may also be used.

Referring now to FIGS. 1-2, a method of using the radially slotted welding electrode 16 and the companion second welding electrode 18 is described in the context of resistance spot welding a stack-up assembly that includes only the overlapping steel and aluminum workpieces 10, 12 although, as described above, this same method may be practiced on stack-up assemblies that include additional steel and/or aluminum workpieces as well. In general, the workpiece stack-up assembly 80 is first provided by applying the organic coating material to the faying surface 10" of the steel workpiece 10, the faying surface 12" of the aluminum workpiece 12, or both faying surfaces 10", 12", and then assembling the steel and aluminum workpieces 10, 12 in overlapping fashion into the stack-up assembly 80 by aligning and fitting the workpieces 10, 12 together with suitable fixturing equipment. The weld face 22 of the radially slotted welding electrode 16 and the weld face 26 of the companion second welding electrode are then brought into contact with their respective first and second sides 84, 86 (also the outer workpiece surfaces 10', 12' in this embodiment) of the workpiece stack-up assembly 80 in facial alignment with each other such that their respective weld face central axes 28, 30 are co-linearly aligned. This general set-up prior to electrical current exchange between the welding electrodes 16, 18 is shown generally in FIG. 1.

The term "facial alignment" as used herein does not necessarily mean that the weld face central axes 28, 30 of the welding electrodes 16, 18 must be perfectly co-linear aligned as will be understood by a skilled artisan having practical experience in spot welding operations. To be sure, some misalignment, both lateral and angular, may occur between the respective weld faces 22, 26 of the welding electrodes 16, 18 due to misalignment of the welding equipment or electrode wear without compromising the ability of the welding electrodes 16, 18 to function as intended. The amount of misalignment that can be tolerated between the opposed weld faces 22, 26 in any given resistance spot welding event is dependent on a variety of factors including shapes and diameters of the weld face 22, 26. Under a wide range of circumstances, however, and as a general but not a mandatory rule, a modest 3° or less of angular misalignment and/or a modest 2.5 mm or less of lateral misalignment can be tolerated between the weld face 22, 26 of the welding electrodes 16, 18 during resistance spot welding of the workpiece stack-up assembly 80 according to practices of the present disclosure.

Once in place, the weld faces 22, 26 of the welding electrodes 16, 18 are immediately pressed against their respective first and second sides 84, 86 of the workpiece stack-up assembly 80 to achieve a predetermined clamping load between the weld faces 22, 26. The clamping load applied by the welding electrodes 16, 18 typically ranges from 400 lbf to 2000 lbf, or more narrowly from 600 lbf to 1300 lbf, and may can be scaled up or down within that range based on the thicknesses of the workpieces 10, 12, the compositions of the workpieces 10, 12, and surface area of the plateau surface 52, among other factors. Because of its location and displacement from the surrounding convex dome portion 42, the plateau surface 52 of the central upstanding plateau 40 engages the first side 84 of the workpiece stack-up assembly 80 before any portion of the surrounding convex dome portion 42 engages the same side 84 of the stack-up assembly 80 including the transverse upstanding arcuate ridges 48 of the trapezoidal weld face sections 44. The plateau surface 52 thus initially supports the entire clamping load and applies a concentrated pressure through the aluminum workpiece 12 to the intermediate organic material layer 14 within the weld zone between the facing weld faces 22, 26, which results in the organic material layer 14 being compressed and initially expelled laterally along the faying interface 84 to bring the confronting workpiece faying surfaces 10", 12" into more direct and intimate interfacial contact. This initial squeeze-out and lateral ejection of organic material is believed to appreciably reduce the volume of organic matter that will eventually be exposed to the elevated temperatures attained during current flow.

Shortly after beginning to press the weld faces 22, 26 of the welding electrodes 16, 18 against the workpiece stack-up assembly 80, an electrical current is exchanged between the welding electrodes 16, 18 and, more particularly, between the portions of the weld faces 22, 26 that are in pressed contact with the first and second sides 84, 86, respectively, of the stack-up assembly 80. The magnitude of the passing electrical current may range from 5 kA to 50 kA and the duration of current flow may range from 40 ms to 2500 ms, or more narrowly 200 ms to 1000 ms. The passing electrical current rapidly heats up the more electrically and thermally resistive steel workpiece 10 to a temperature above the melting point or range of the adjacent portion of the aluminum workpiece 12. Heat from the steel workpiece 10 is transferred into the adjacent portion of the aluminum workpiece 12 to create a molten weld pool contained within the aluminum workpiece 12 that wets the adjacent faying surface 10" of the steel workpiece 10. Such wetting of the steel workpiece faying surface 10" with molten aluminum tends to cause molten aluminum to react with or dissolve iron from the steel workpiece 10 while simultaneously growing a brittle intermetallic layer along the faying surface 10" of the steel workpiece 10 that may include $FeAl_3$ compounds, $Fe_2Al_5$ compounds, and possibly other Fe—Al intermetallic compounds as well.

The weld face 22 of the radially slotted welding electrode 16 further lateral displacement of the intermediate organic material layer 14 away from the weld zone during current flow. In particular, when the weld face 22 of this welding electrode 16 originally engages and is pressed against the first side 84 of the workpiece stack-up assembly 80, only the plateau surface 52 is in contact with the stack-up assembly 80, as just described. As the electrical current flow heats the steel workpieces 10 and the steel workpiece 10 heats the aluminum workpiece 12, the weld face 22 impresses further into the first side 84 of the workpiece stack-up assembly 80, which brings the convex dome portion 40 of the weld face 22 into pressed engagement with the first side of the stack-up assembly 80 and, specifically, the trapezoidal weld face sections 44 that include the transverse upstanding arcuate ridges 48. These ridges 48 help establish good mechanical and electrical contact with the first side 84 of the workpiece stack-up assembly 80. This is especially true if the first side 84 of the stack-up assembly 80 includes a surface layer of a refractory oxide material such as those that are usually found on the surfaces of aluminum workpieces since the upstanding arcuate ridges 48 can assist in breaking through such insulating and mechanically tough surface layers.

As the convex dome portion 40 impresses progressively further into the first side 84 of the workpiece stack-up assembly 80, and the upstanding arcuate ridges 48 of the trapezoidal weld face sections 46 are sequentially brought into contact with the first side 84, the annular channel 54 surrounding the central plateau 40 and a plurality of radial slots 56 that communicate with the annular channel 54 influence the pressure distribution on the intermediate organic material layer 14 at the faying interface 84. That is, the annular channel 54 and a plurality of radial slots 56 do not transmit the applied clamping load to the first side 84 of the workpiece stack-up assembly 80 and, consequently, the corresponding portions of the faying surface 12″ of the aluminum workpiece 12 that mimic the channel and slot geometry of the weld face 22 will experience less pressure from the welding electrode 16 compared to portions that correspond to the central upstanding plateau 40 and the trapezoidal weld face sections 46. These low pressure regions of the faying surface 12″ result in low pressure radial slotted flow paths being developed between the workpiece faying surfaces 10″, 12″ through which the intermediate organic material layer 14 can be further displaced laterally away from the weld zone as the spot welding process progresses and the weld face of the radially slotted welding electrode 22 continues to impress into the workpiece stack-up assembly 80. In other words, the radially slotted welding electrode 16 is designed to not trap organic material within the weld zone at the faying interface 84 but, rather, to facilitate its ejection while maintaining spot welding functionality.

The radially slotted welding electrode 16 may confer other benefits as well. Most notably, when electrical current flow is first initiated between the welding electrodes 16, 18, at least a major portion of the electrical current flows through the central upstanding plateau 40 given that the plateau 40 is originally in sole contact with the first side 84 of the workpiece stack-up assembly 80. In that regard, heating will initiate in and around the central upstanding plateau 40 and any remaining organic material located at the faying interface 84 in a region mirroring the annular channel 54 of the weld face 22 will be exposed to heat first. This remaining organic material may release gaseous products during thermal decomposition. The low pressure radial slotted flow paths developed between the workpiece faying surfaces 10″, 12″ allows these gaseous decomposition products to escape and, possibly, pressurize and expel further residual organic material from the weld zone as the escaping gases navigate the low pressure flow paths. As such, the design of the weld face 22 of the radially slotted welding electrode 16 and its proclivity for driving organic material and thermal decomposition gaseous products away from the weld zone reduces or altogether eliminates the amount of thermal residues that may be exposed to the molten weld pool and ultimately find their way into the weld joint as weld-joint-weakening disparities and defects.

Upon termination of the electrical current flow between the weld faces 22, 26 of the welding electrodes 16, 18, and with the welding electrodes 16, 18 still engaged with their respective sides 84, 86 of the workpiece stack-up assembly 80, the molten weld pool created within the aluminum workpiece 12 solidifies into a weld joint 64, as shown in FIG. 8. The weld joint 64 has a bonding interface 66 with the faying surface 10″ of the steel workpiece 12 and generally includes a nugget 68 of resolidified aluminum workpiece material, which usually has a nominal diameter in the range of 6 mm to 8 mm, and an intermetallic layer located along a bonding interface 66 of the weld joint 64 and the steel workpiece 10 that may include $FeAl_3$ compounds, $Fe_2Al_5$ compounds, and possibly other Fe—Al intermetallic compounds as well. The weld joint 66 may penetrate all the way through the aluminum workpiece 12, as shown, and it typically has a cross-sectional shape in the form of a truncated cone.

The bonding interface 66 between weld joint 64 and the faying surface 10″ of the steel workpiece 12 may be bowed inwardly into to the weld joint 66 at least partially on account of the structure of the weld face 22 of the radially slotted welding electrode 16. Indeed, since the electrical current in initially passed mainly through the central upstanding plateau 40 of the radially slotted welding electrode 16, the progressive heating and resultant softening of the steel and aluminum workpieces 10, 12 enables both of the welding electrodes 16, 18 to reshape the workpieces 10, 12 as larger portions of the weld faces 22, 26 participate in conveying electrical current. As shown in FIG. 8, for instance, the weld face 22 of the radially slotted welding electrode 16 ends up fully indented into the first side 84 of the stack-up assembly 80 while, in contrast, the weld face 26 of the second welding electrode 18 experiences less indentation but locally "bodily" deforms the workpiece 10 such that the second side 86 of the stack-up assembly 80 deforms and wraps around weld face 36 such that the weld face 36 fully participates in the exchange of electrical current. The bodily deformation of the steel workpiece 10 ultimately results in the bowed ingress of its faying surface 10″ into the molten weld pool and the eventual arrival at the bowed bonding interface 66.

The development of low pressure regions on the faying surface 12″ of the aluminum workpiece 12 that manifest themselves as low pressure radial slotted flow paths between the workpiece faying surfaces 10″, 12″ can generally be realized notwithstanding the particular construction of the weld face 26 of the second welding electrode 18. In some instances, however, the design of the weld face 26 of the second welding electrode 18 can enhance the effectiveness of the low pressure radial slotted flow paths. For example, if the second welding electrode 18 is constructed as shown in FIG. 4, it may be desired to provide the innermost ridge 60′ that immediately surrounds the weld face axis 30 with a smaller diameter than that of the plateau surface 52 of the central upstanding plateau 40. In this scenario, the innermost circular upstanding ridge 60′ on the weld face 26 of the second welding electrode 18 will make first contact with the second side 86 of the workpiece stack-up assembly 80, resulting in the clamping pressure being transferred between the plateau surface 52 of the central upstanding plateau 40, on one side, and the innermost circular ridge 60′, on the other side. In this way, the intermediate organic material layer 14 experiences more concentrated pressure through the steel workpiece 10 as well as through the aluminum workpiece 12. Such concentrated pressure application through both workpiece faying surfaces 10″, 12″ will, as the clamping force increases, laterally outwardly displace and squeeze out a very substantial volume of the intermediate organic material layer 14 from the weld zone. And, on continued impression of the weld faces 22, 26, additional sequential outward radial displacement of organic material from the weld zone will occur.

While the innermost circular ridge 60′ on the weld face 26 of the second welding electrode 18 preferably has a smaller diameter than the plateau surface 52 of the central upstanding plateau 40 on the weld face 22 of the radially slotted welding electrode 16, such a relationship is not the only workable option. For instance, if the innermost circular ridge 60′ has a larger diameter than the plateau surface 82, and is thus located radially outward of the central round plateau 40 when the two weld faces 22, 26 are facially aligned, the low pressure regions on the faying surface 12″ of the aluminum workpiece 12 that manifest themselves as low pressure radial slotted flow paths between the workpiece faying surfaces 10″, 12″ are still developed to facilitate lateral displacement of the intermediate organic material layer 14 and outgassing of thermal decomposition gaseous products.

This relationship between the weld faces 22, 26 is additionally aided by the fact that the aluminum workpiece 12 and the steel workpiece 10 are deformed bodily, as opposed to flexing, due to their stiffnesses, which contributes to the squeezing out or lateral expelling of the intermediate organic material layer 14.

For similar reasons to those just discussed, the second welding electrodes 218, 318 illustrated in FIGS. 6-7 can support the operation and functionality of the radially slotted welding electrode 16 when their base weld face surfaces 258, 358 are planar. Preferably, however, the base weld face surfaces 268, 358 of those electrode weld faces 226, 326 are convexly profiled. When the base weld face surfaces 258, 358 are so profiled, each of these surfaces has a central location (similar to the base weld face surface 126 of the ballnose weld welding electrode 118) that will make initial contact with the second side 86 of the workpiece stack-up assembly 80. This leads to the clamping pressure being transferred between the plateau surface 52 of the central upstanding plateau 40, on one side, and the central location of the base weld face surface 258, 358 of the second welding electrode 218, 318, on the other side. In this way, the intermediate organic material layer 14 experiences more concentrated pressure through the steel workpiece 10 as well as through the aluminum workpiece 12. Such concentrated pressure application through both workpiece faying surfaces 10″, 12″ will, as the clamping force increases, laterally outwardly displace and squeeze out a very substantial volume of the intermediate organic material layer 14 from the weld zone. And, on continued impression of the weld faces 22, 226, 326, additional sequential outward radial displacement of organic material from the weld zone will occur.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of resistance spot welding a workpiece stack-up assembly that includes an aluminum workpiece and an overlapping adjacent steel workpiece, the method comprising:

providing a workpiece stack-up assembly that has a first side and an opposed second side, the workpiece stack-up assembly including an aluminum workpiece and an adjacent steel workpiece that overlaps the aluminum workpiece, and further including an intermediate organic material layer disposed between confronting faying surfaces of the overlapping aluminum and steel workpieces, wherein the aluminum workpiece is proximate the first side of the stack-up assembly and the steel workpiece is proximate the second side of the stack-up assembly;

pressing a weld face of a radially slotted welding electrode against the first side of the workpiece stack-up assembly, the weld face of the radially slotted welding electrode including a central upstanding plateau and a convex dome portion that surrounds the central upstanding plateau and which includes a plurality of trapezoidal weld face sections that are circumferentially spaced on a base surface of the convex dome portion around the central upstanding plateau, each of the trapezoidal weld face sections including a plurality of transverse upstanding arcuate ridges that are radially spaced apart along the base surface of the convex dome portion, and, wherein, an annular channel surrounds the central upstanding plateau and a plurality of radial slots communicate with the annular channel and extend outwardly towards an outer circumference of the base surface between the trapezoidal weld face sections;

pressing a weld face of a second welding electrode against the second side of the workpiece stack-up assembly, the weld face of the second welding electrode being facially aligned with the weld face of the radially slotted welding electrode when the weld faces of the radially slotted and second welding electrodes are pressed against their respective first and second sides of the workpiece stack-up assembly;

passing an electrical current between the weld face of the radially slotted welding electrode and the weld face of the second welding electrode to create a molten weld pool contained within the aluminum workpiece, the molten weld pool wetting the faying surface of the steel workpiece; and terminating passage of the electrical current between the weld face of the radially slotted welding electrode and the weld face of the second welding electrode to allow the molten weld pool to solidify into a weld joint that bonds the aluminum and steel workpieces together.

2. The method set forth in claim 1, wherein the first side of the workpiece stack-up assembly is an outer surface of the aluminum workpiece and the second side of the workpiece stack-up assembly is an outer surface of the steel workpiece.

3. The method set forth in claim 1, wherein the workpiece stack-up assembly includes an additional aluminum workpiece and/or an additional steel workpiece in addition to the aluminum and steel workpieces that overlap and are adjacent to one another.

4. The method set forth in claim 1, wherein, during pressing of the weld face of the radially slotted welding electrode against the first side of the workpiece stack-up assembly, a plateau surface of the central upstanding plateau contacts the first side of the stack-up assembly before any of the transverse upstanding arcuate ridges included in the plurality of trapezoidal weld face sections contacts the first side such that a clamping load applied by the weld faces of the radially slotted and second welding electrodes is initially transferred through the central upstanding plateau.

5. The method set forth in claim 4, wherein, prior to passage of the electrical current, only the plateau surface of the central upstanding plateau contacts the first side of the workpiece stack-up assembly, and wherein, during passage of the electrical current, the trapezoidal weld face sections of the convex dome portion that surrounds the central upstanding plateau progressively come into contact with the first side of the workpiece stack-up assembly starting with innermost upstanding arcuate ridges of the trapezoidal weld face sections and continuing radially outwards towards outermost upstanding arcuate ridges of the trapezoidal weld face sections.

6. The method set forth in claim 1, wherein the weld face of the second welding electrode includes a convex base weld face surface and a plurality of upstanding circular ridges that project outwardly from the convex base weld face surface such that the upstanding circular ridges are separated by intervening circular portions of the convex base weld face surface.

7. The method set forth in claim 6, wherein a diameter of an innermost upstanding circular ridge of the weld face of the second welding electrode is smaller than a diameter of the plateau surface of the central upstanding plateau of the weld face of the radially slotted welding electrode.

8. A welding electrode comprising:
a body; and
a weld face carried by one end of the body, the weld face comprising a central upstanding plateau, having a plateau surface, and a convex dome portion surrounding the central upstanding plateau, the convex dome portion further comprising a base surface and a plurality of trapezoidal weld face sections that are circumferentially spaced on the base surface around the central upstanding plateau, each of the trapezoidal weld face sections including a plurality of transverse upstanding arcuate ridges that are radially spaced apart along the base surface of the convex dome portion;
wherein a plurality of radial slots communicates with an annular channel that surrounds the central upstanding plateau and extends outwardly towards an outer circumference of the base surface of the convex dome portion, each of the plurality of radial slots extending between two adjacent trapezoidal weld face sections.

9. The welding electrode set forth in claim 8, wherein each of the trapezoidal weld face sections includes two to ten transverse upstanding arcuate ridges, and wherein each of the transverse upstanding arcuate ridges in each of the trapezoidal weld face sections has a ridge height that ranges from 20 μm to 400 μm and is separated from each of its adjacent ridges by a radial spacing of 50 μm to 1800 μm.

10. The welding electrode set forth in claim 8, wherein the plateau surface of the central upstanding plateau is positively displaced above the surrounding base weld face surface of the convex dome portion such that the plateau surface is raised above an innermost transverse upstanding arcuate ridge of each of the plurality of trapezoidal weld face sections.

* * * * *